(12) United States Patent
Cserna et al.

(10) Patent No.: US 11,878,695 B2
(45) Date of Patent: Jan. 23, 2024

(54) SURFACE GUIDED VEHICLE BEHAVIOR

(71) Applicant: Motional AD LLC, Boston, MA (US)

(72) Inventors: Bence Cserna, East Boston, MA (US); Shih-Yuan Liu, Arlington, MA (US); Scott D. Pendleton, Singapore (SG)

(73) Assignee: Motional AD LLC, Boston, MA (US)

( * ) Notice: Subject to any disclaimer, the term of this patent is extended or adjusted under 35 U.S.C. 154(b) by 34 days.

(21) Appl. No.: 17/158,497

(22) Filed: Jan. 26, 2021

(65) Prior Publication Data

US 2022/0234589 A1 Jul. 28, 2022

(51) Int. Cl.
| | | |
|---|---|---|
| *B60W 40/06* | (2012.01) | |
| *G01C 21/00* | (2006.01) | |
| *B60W 50/02* | (2012.01) | |

(52) U.S. Cl.
CPC ........ *B60W 40/06* (2013.01); *B60W 50/0205* (2013.01); *G01C 21/3815* (2020.08); *B60W 2050/021* (2013.01); *B60W 2050/0215* (2013.01); *B60W 2420/10* (2013.01); *B60W 2420/54* (2013.01); *B60W 2552/35* (2020.02); *B60W 2554/20* (2020.02); *B60W 2556/10* (2020.02); *B60W 2556/65* (2020.02)

(58) Field of Classification Search
CPC ......... B60W 2050/021; B60W 50/023; B60W 50/029; B60W 2552/35; B60W 2552/40; B60W 2552/53; B60W 40/068; B60W 40/072; B60W 40/076; B60W 40/048; B60W 40/06; B60W 50/0205; B60W 2050/0215; B60W 2050/023; B60W 2050/0225; B60W 50/035; B60W 2420/10; B60W 2420/54; B60W 2554/20; G01C 21/3815; G01C 21/3819; G01C 21/3822; G01C 21/3826; G01C 21/3833
See application file for complete search history.

(56) References Cited

U.S. PATENT DOCUMENTS

| | | | |
|---|---|---|---|
| 6,199,001 B1 * | 3/2001 | Ohta | ..................... B60W 40/06 701/445 |
| 9,630,611 B1 * | 4/2017 | Dufford | ................. G01C 21/30 |
| 2005/0212666 A1 * | 9/2005 | Kawazoe | ............. G05D 1/0227 340/436 |

(Continued)

FOREIGN PATENT DOCUMENTS

| | | |
|---|---|---|
| DE | 102014207084 | 10/2015 |
| EP | 3382342 | 10/2018 |

(Continued)

OTHER PUBLICATIONS

[No Author Listed], "SAE; Surface Vehicle Recommended Practice, Taxonomy and Definitions for Terms Related to Driving Automation Systems for On-Road Motor Vehicles," SAE International, Sep. 30, 2016, 30 pages.

*Primary Examiner* — Babar Sarwar
(74) *Attorney, Agent, or Firm* — Fish & Richardson P.C.

(57) ABSTRACT

Among other things, techniques are described for receiving, from at least one sensor of a vehicle, a sensor measurement indicative of at least one of a sound or a vibration associated with a road element; identifying the road element based on a pattern in the sensor measurement; determining, based on the road element, a vehicle behavior for the vehicle; and controlling the vehicle to operate according to vehicle behavior.

19 Claims, 9 Drawing Sheets

(56) References Cited

U.S. PATENT DOCUMENTS

| | | | |
|---|---|---|---|
| 2016/0221581 A1 | 8/2016 | Talwar et al. | |
| 2017/0297580 A1* | 10/2017 | Hanatsuka | G08G 1/0141 |
| 2019/0193741 A1* | 6/2019 | Hitomi | G08G 1/096791 |
| 2020/0189590 A1* | 6/2020 | Luo | G06N 3/088 |
| 2020/0207358 A1* | 7/2020 | Katz | G01C 21/3697 |
| 2020/0307543 A1* | 10/2020 | Morita | B60W 10/22 |
| 2020/0341466 A1* | 10/2020 | Pham | G06V 20/56 |
| 2022/0001899 A1* | 1/2022 | Kim | B60W 50/04 |
| 2022/0009501 A1* | 1/2022 | Guan | B60W 10/18 |
| 2022/0108604 A1* | 4/2022 | Duggal | G08G 1/0141 |

FOREIGN PATENT DOCUMENTS

| | | |
|---|---|---|
| EP | 3382342 A1 * | 10/2018 |
| JP | 2001-004382 | 1/2001 |
| KR | 2016-0109616 | 9/2016 |

\* cited by examiner

SURFACE GUIDED VEHICLE BEHAVIOR

FIELD OF THE INVENTION

This description relates to surface guided vehicle behavior.

BACKGROUND

Roads on which vehicles drive include various surface elements. For example, roads include pavement markers, road dividers, painted road markings, parking blocks/chalks/stoppers, and rumble strips.

DETAILED DESCRIPTION

Figure 1:
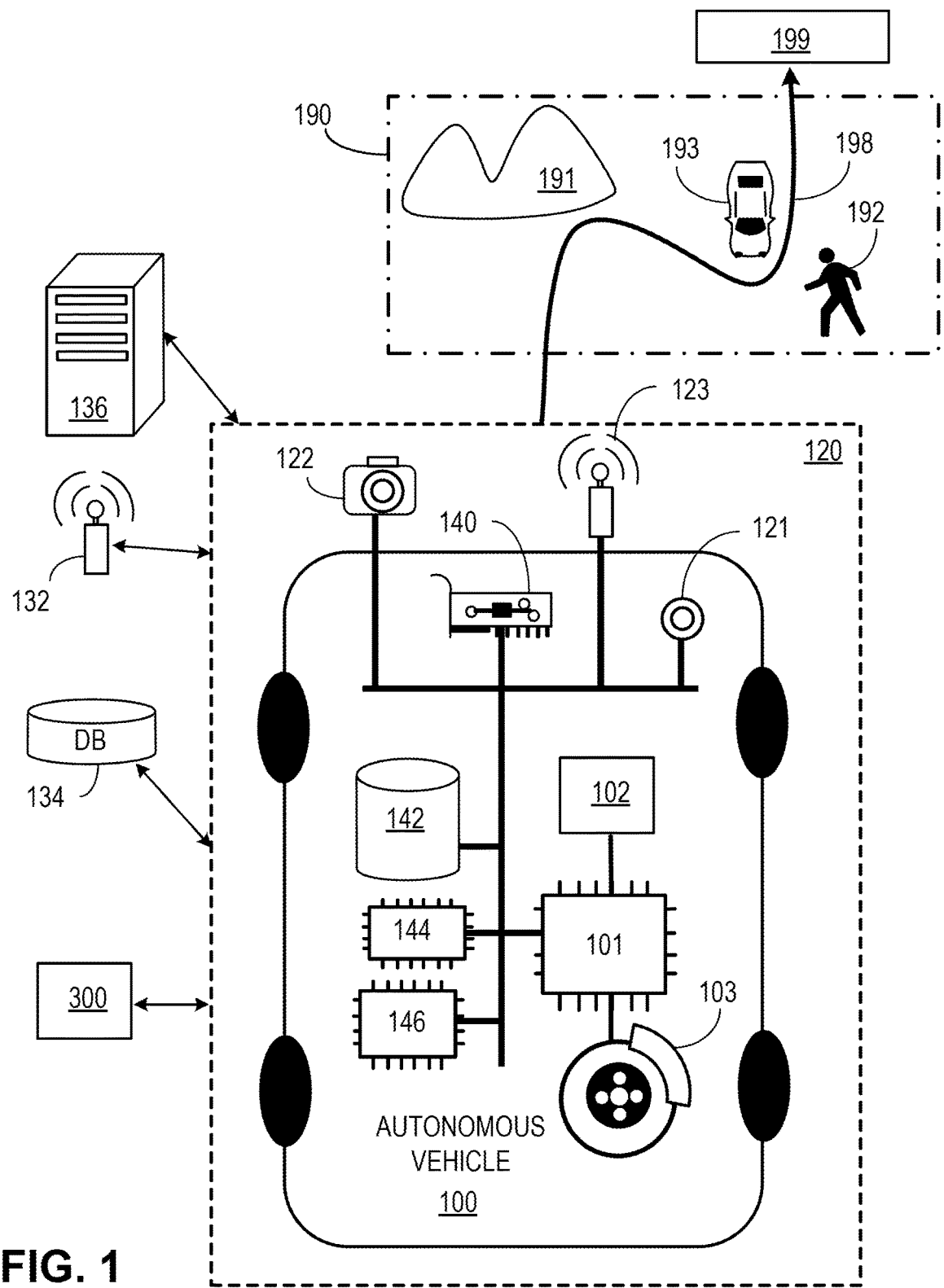
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings are not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Surface Guided Decision Making General Overview Behavior of a vehicle is adapted based on identifying surface elements that impact safety and drivability of the vehicle. In order to identify a surface element, vehicle sensors measure sounds and/or vibrations associated with the surface element. The surface element is then identified based on patterns in the sensor measurements. Based on the road surface, the vehicle can determine an appropriate vehicle response to encountering the surface element, which allows the vehicle to better respond to the surface element. Additionally, the vehicle can compare the measurement of the surface element to historical measurements of the surface element. Doing so allows the vehicle to determine a calibration status of the sensor that performed the historical measurement. In some examples, the vehicle publishes the identified surface elements and the associated sensor measurements to a shared database.

Adapting the behavior of a vehicle based on surface elements improves the safety and reliability of the vehicle. Additionally, using sound and/or vibration measurements to detect surface elements enables a vehicle to detect scenarios and conditions that are not otherwise detectable using other types of measurements. Further, comparing the measurements to historical measurements facilitates mitigating sensor failures and/or detecting sensor impairment. Publishing the identified road elements to a shared database allows vehicle planning systems to leverage historical information to prepare for known road surface disturbances.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
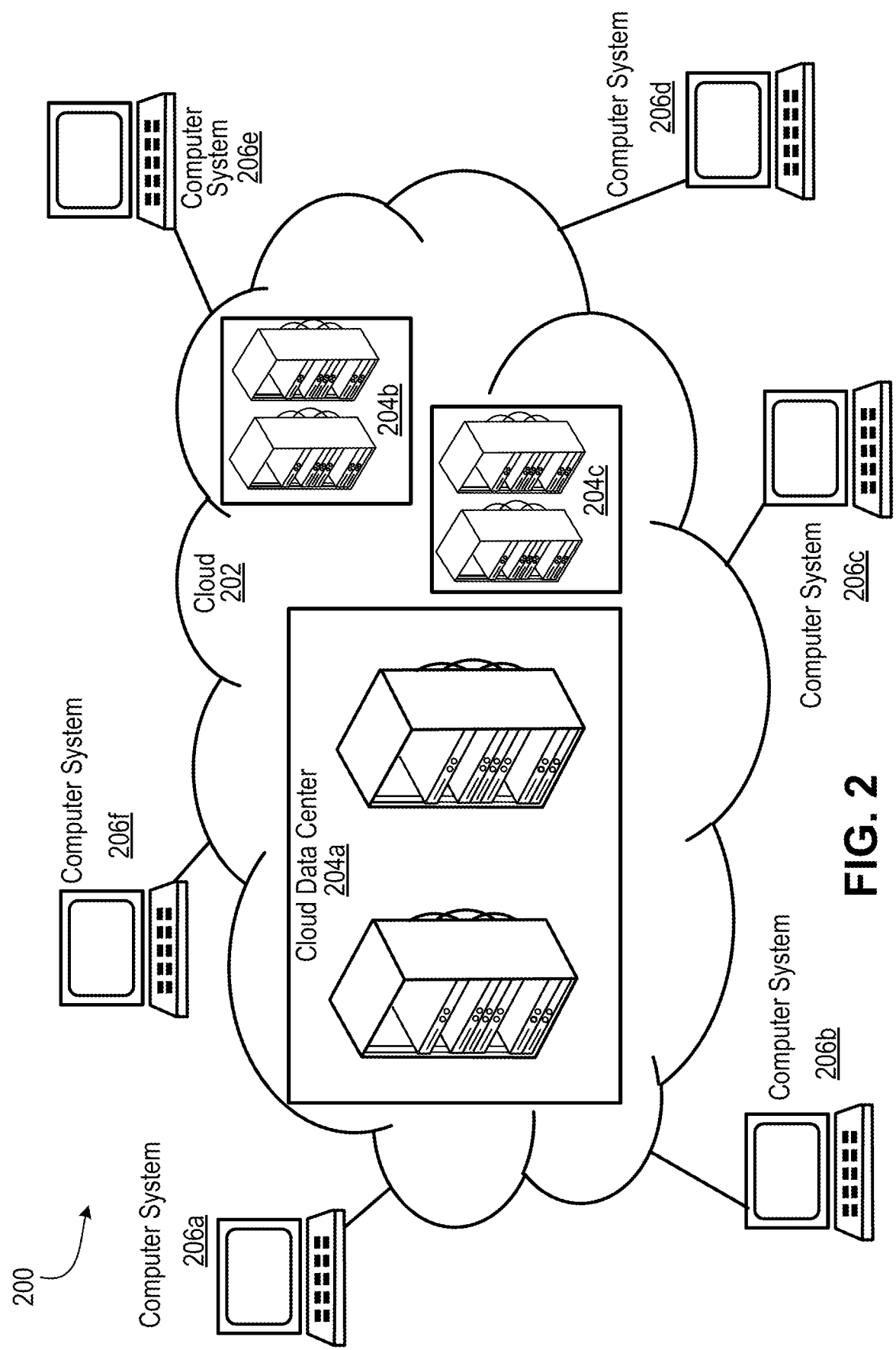
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
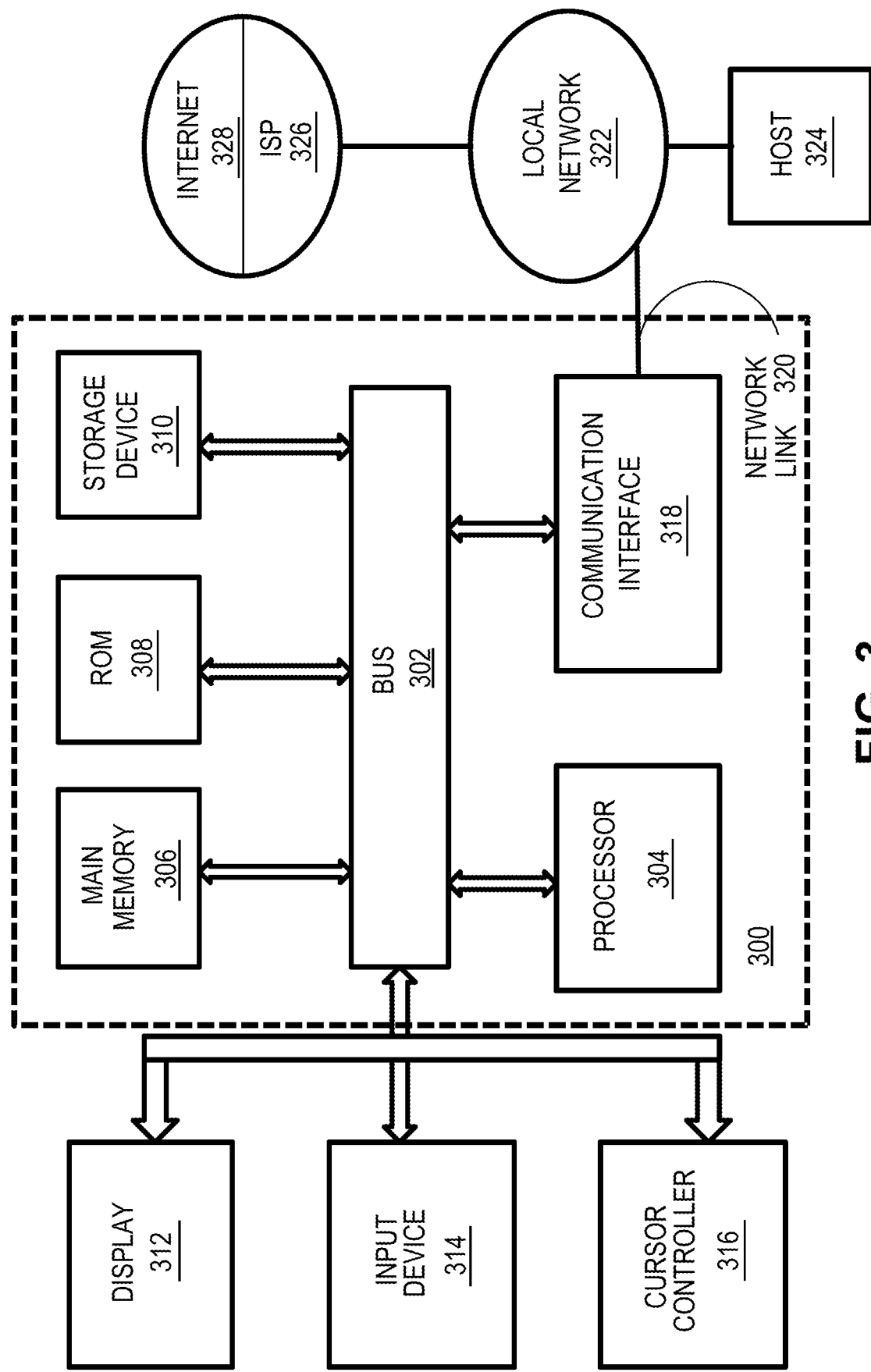
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
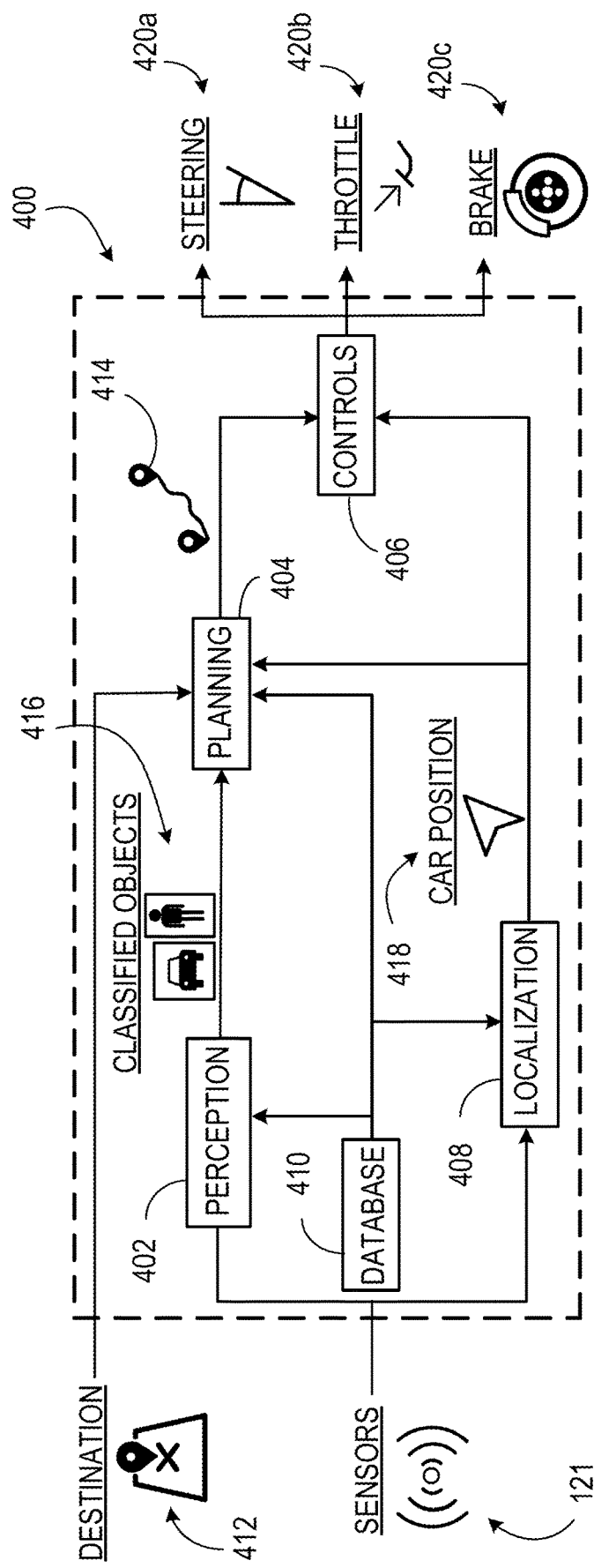
FIG. 4 shows an example architecture for an autonomous vehicle.

FIG. 4 shows an example architecture 400 for an autonomous vehicle (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road elements such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Path Planning

Figure 5:
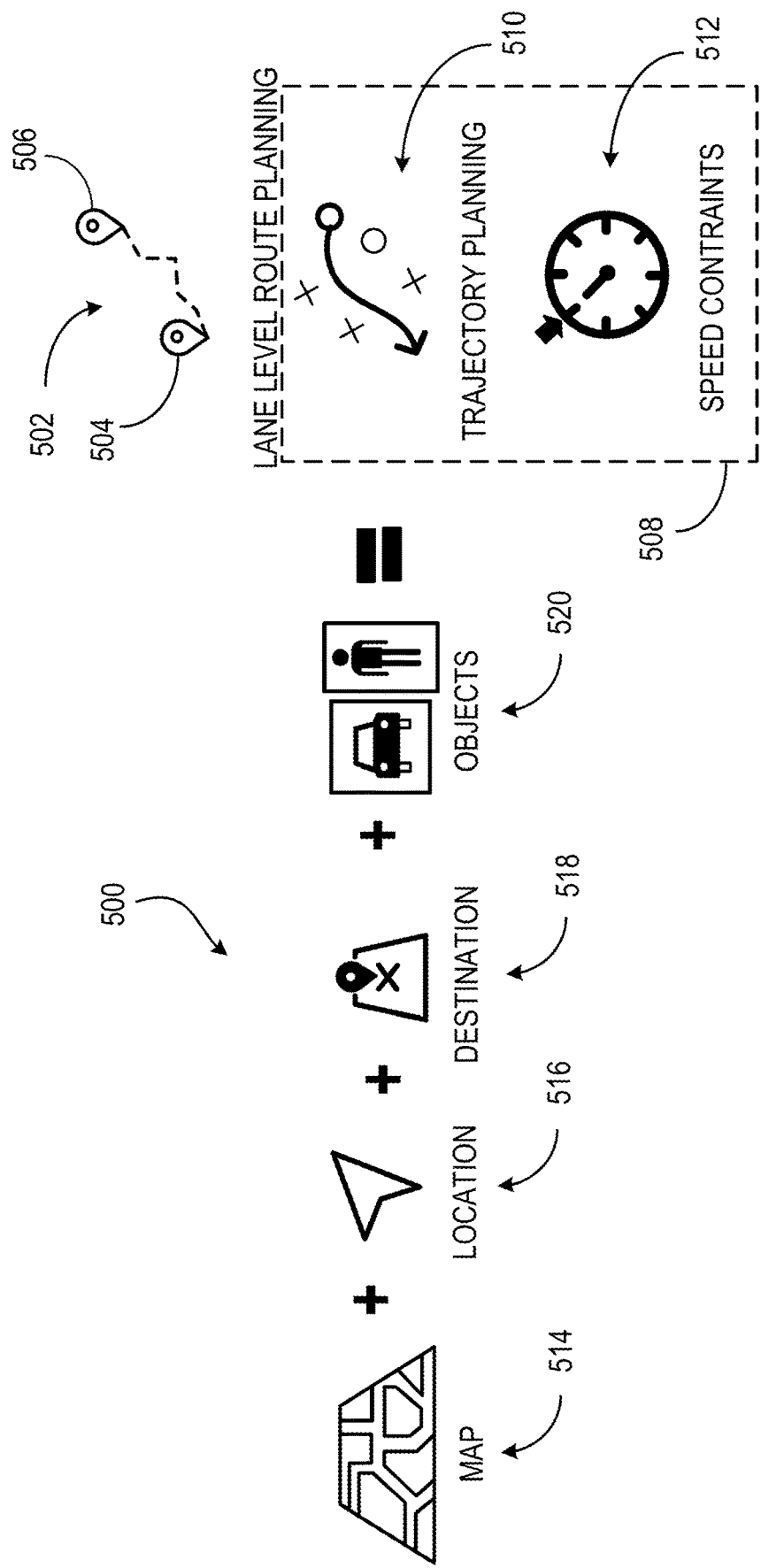
FIG. 5 shows a block diagram of the relationships between inputs and outputs of a planning module.

FIG. 5 shows a block diagram 500 of the relationships between inputs and outputs of a planning module 404 (e.g., as shown in FIG. 4). In general, the output of a planning module 404 is a route 502 from a start point 504 (e.g., source location or initial location), and an end point 506 (e.g., destination or final location). The route 502 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 502 includes "off-road" segments such as unpaved paths or open fields.

In addition to the route 502, a planning module also outputs lane-level route planning data 508. The lane-level route planning data 508 is used to traverse segments of the route 502 based on conditions of the segment at a particular time. For example, if the route 502 includes a multi-lane highway, the lane-level route planning data 508 includes trajectory planning data 510 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 508 includes speed constraints 512 specific to a segment of the route 502. For example, if the segment includes pedestrians or unexpected traffic, the speed constraints 512 may limit the vehicle 100 to a travel speed slower than an expected speed, e.g., a speed based on speed limit data for the segment.

In an embodiment, the inputs to the planning module 404 includes database data 514 (e.g., from the database module 410 shown in FIG. 4), current location data 516 (e.g., the AV position 418 shown in FIG. 4), destination data 518 (e.g., for the destination 412 shown in FIG. 4), and object data (e.g., the classified objects 416 as perceived by the perception module 402 as shown in FIG. 4). In some embodiments, the database data 514 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Autonomous Vehicle Control

Figure 6:
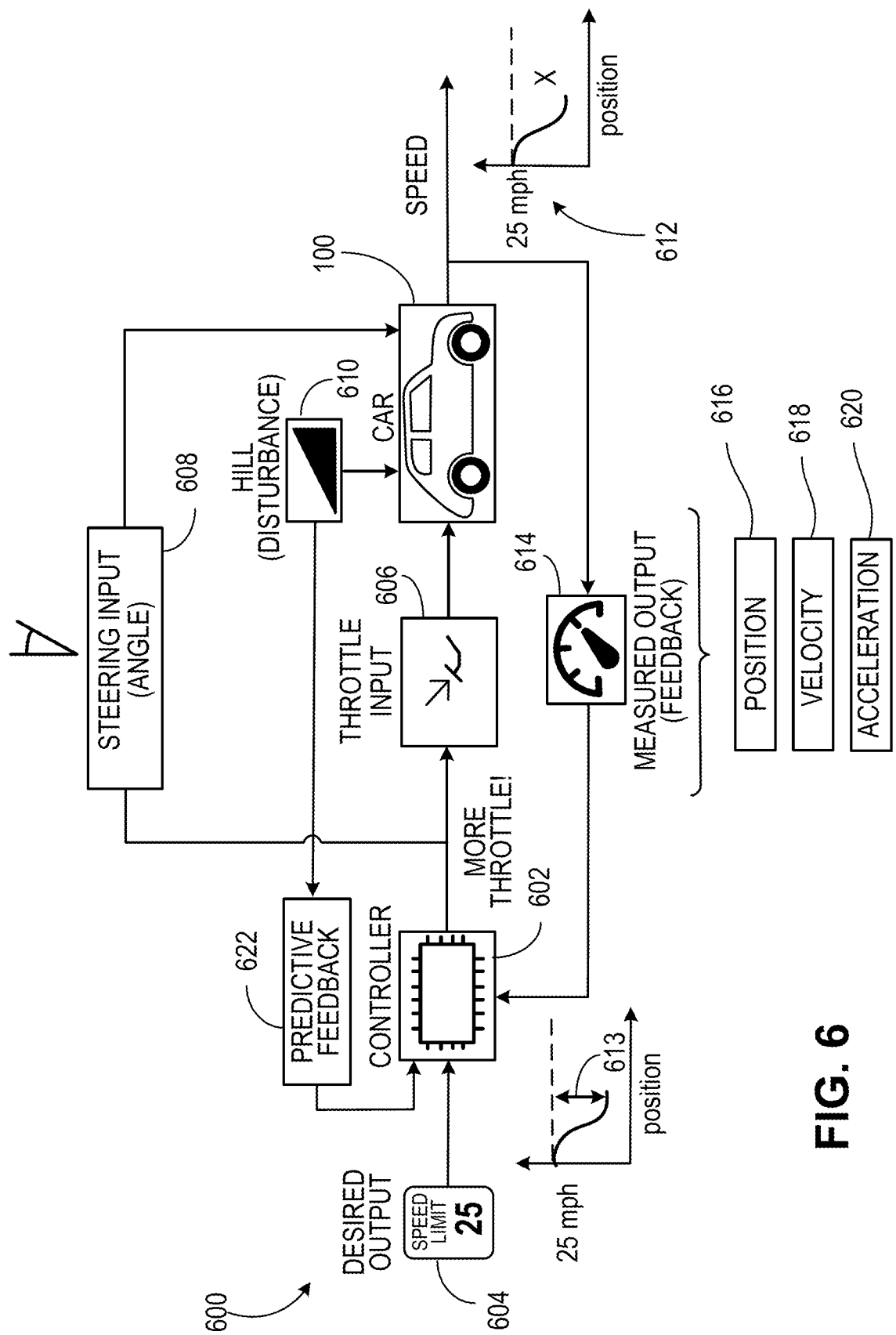
FIG. 6 shows a block diagram of the inputs and outputs of a control module.

FIG. 6 shows a block diagram 600 of the inputs and outputs of a control module 406 (e.g., as shown in FIG. 4). A control module operates in accordance with a controller 602 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 602 when the instructions are executed (e.g., by the one or more processors).

In an embodiment, the controller 602 receives data representing a desired output 604. The desired output 604 typically includes a velocity, e.g., a speed and a heading. The desired output 604 can be based on, for example, data received from a planning module 404 (e.g., as shown in FIG. 4). In accordance with the desired output 604, the controller 602 produces data usable as a throttle input 606 and a steering input 608. The throttle input 606 represents the magnitude in which to engage the throttle (e.g., acceleration control) of an vehicle 100, e.g., by engaging the steering pedal, or engaging another throttle control, to achieve the desired output 604. In some examples, the throttle input 606 also includes data usable to engage the brake (e.g., deceleration control) of the vehicle 100. The steering input 608 represents a steering angle, e.g., the angle at which the steering control (e.g., steering wheel, steering angle actuator, or other functionality for controlling steering angle) of the AV should be positioned to achieve the desired output 604.

In an embodiment, the controller 602 receives feedback that is used in adjusting the inputs provided to the throttle and steering. For example, if the vehicle 100 encounters a disturbance 610, such as a hill, the measured speed 612 of the vehicle 100 is lowered below the desired output speed. In an embodiment, any measured output 614 is provided to the controller 602 so that the necessary adjustments are performed, e.g., based on the differential 613 between the measured speed and desired output. The measured output 614 includes a measured position 616, a measured velocity 618 (including speed and heading), a measured acceleration 620, and other outputs measurable by sensors of the vehicle 100.

In an embodiment, information about the disturbance 610 is detected in advance, e.g., by a sensor such as a camera or LiDAR sensor, and provided to a predictive feedback module 622. The predictive feedback module 622 then provides information to the controller 602 that the controller 602 can use to adjust accordingly. For example, if the sensors of the vehicle 100 detect ("see") a hill, this information can be used by the controller 602 to prepare to engage the throttle at the appropriate time to avoid significant deceleration.

Surface Guided Decision Making

Figure 7:
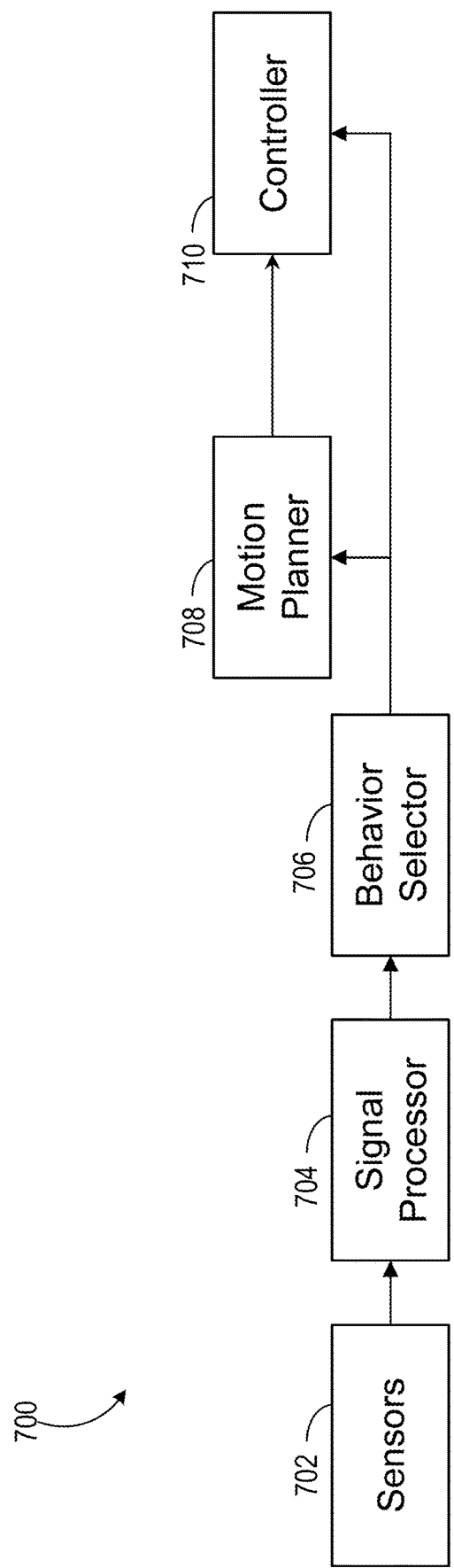
FIG. 7 illustrates a block diagram of an example system for surface guided decision making.

FIG. 7 illustrates a block diagram of an example system 700 for surface guided decision making. The system 700 is configured to identify surface elements along a path of a vehicle. The system 700 is also configured to adapt the vehicle's behavior based on the identified surface elements. A surface element is any raised surface or surface depression that a vehicle can contact. Example surface elements include raised pavement markers (e.g., reflective/non-reflective pavement markers), guard rails, drain grates, road dividers, painted road markings, parking blocks/chalks/stoppers, rumble strips, speed bumps, sidewalks, curbs, road connections, expansion joints or movement joints, pot holes, ruts, and grooves.

As shown in FIG. 7, the system 700 includes sensors 702 (e.g., sensors that are the same as, or similar to, sensors 121 of FIG. 1), signal processor 704 (e.g., a processor that is the same as, or similar to, processors 146 of FIG. 1 or processor 304 of FIG. 3), behavior selector 706, motion planner 708 (e.g., a motion planner that is the same as, or similar to, planning module 404 of FIG. 4 and as described in FIG. 5), and controller 710 (e.g., a controller that is the same as, or similar to, control module 406 of FIG. 4 and/or controller 602 of FIG. 6).

In some examples, one or more components of the system 700 are implemented using a computer system that is the same as, or similar to, the computer system 300 described in FIG. 3. Additionally or alternatively, one or more components can be implemented on a cloud computing environment that is the same as, or similar to, the cloud computing environment 200 described in FIG. 2. Note that the system 700 is shown for illustration purposes only, as the system 700 can include additional components and/or have one or more components removed without departing from the scope of the disclosure. Further, the various components of the system 700 can be arranged and connected in any manner. Although the following discussion describes the system 700 in the context of identifying one surface element along a vehicle path, the system 700 can simultaneously or consecutively identify more than one surface element.

In an embodiment, the sensors 702 include at least one sensor configured to capture data associated with surface elements along a vehicle path. The sensors 702 are also referred to as a surface sensor suite. Example sensors include vibration sensors, tilt sensors, shock sensors, accelerometers, gyroscopes, tire pressure sensors, suspension pressure sensors, extension sensors, sound pressure sensors, and microphones, among other examples. The sensors 702 are arranged on the vehicle in one or more arrangements, such as an array arrangement, a one-sensor-per-wheel arrangement, or a central arrangement. In an array arrangement, a plurality of sensors are arranged in rows and columns across an area of the vehicle. In a one-sensor-per-wheel arrangement, a respective sensor is disposed on at least one wheel of the vehicle. In a central arrangement, at least one sensor is centrally located on the vehicle. In examples where the sensors 702 include more than one type of sensor, the different types of sensors can include different numbers and different arrangements.

In an embodiment, the sensors 702 are configured to measure data indicative of a sound and/or a vibration associated with surface elements. That is, the sensors 702 measure a sound and/or a vibration induced by a surface element. In some examples, the sensors 702 measure the sound and/or vibration when the vehicle contacts a surface element (e.g., when a tire contacts the surface element). In other examples, the sensors 702 measure the sound and/or vibration when another vehicle contacts the surface element. The sensors 702 provide the sensor data to the signal processor 704.

In an embodiment, the signal processor 704 is configured to perform operations related to processing the sensor data. Example operations include preprocessing the data to remove noise from the data and extracting, from the data, patterns that can be used to identify surface elements. More specifically, the data is preprocessed to filter for noise (e.g., using a low pass filter), or to isolate the effects of the surface element from other known factors that impact the sensor signal (e.g., gravitational force direction changes with respect to road slope). In one example, machine learning is used to train the signal processor 704 to extract the patterns to identify surface elements. In this example, the data is collected, annotated to correspond to one of the specified classes of surface elements, and then a neural network, for example, is trained to perform the classification. In one implementation, the neural network is a Recurrent Neural Network. In this implementation, the raw sensor data is fed into the network with some fixed lookback time window for the recursion. In other implementations, non-recurrent networks are used (e.g., an artificial neural network ANN). For example, a Fourier transform is performed over a time window of the sensor data (e.g., where the magnitude of the signal is greater than predetermined frequency domain ranges). The transformed data is provided as input features to a neural network.

In another example, a model based approach is used to train the signal processor 704. In this example, the signals from the sensors are related back to a guiding physics based equation and the surface elements are constructed with a high degree of regularity. More specifically, if the car suspension parameters are known, and the speed bumps encountered are all of standard dimensions, a formula is derived for expected vertical acceleration at various locations on the car body as a function of forward car speed while traversing the bump. Thus, vertical acceleration sensor signals within a predetermined threshold of the expected value are taken as an observation of a speed bump.

In one example, the signal processor 704 is trained using known data patterns to identify and extract such data patterns. The known data pattern can be an expected frequency change in the data. For instance, when traveling over a rumble strip, the data pattern is an expected frequency in the vertical acceleration signal (e.g., as a function of travel speed given the individual strip separation distance). The known data pattern can also be magnitude and directional expectations. For instance, magnitude and directional expectations of signals can be used to differentiate between a pothole or dip and a speed bump. More specifically, traveling over a speed bump would expect some speed dependent time delay between a vertical rise followed by a drop corresponding to the standard width of a speed bump. Furthermore, the magnitude of acceleration signal resulting from a curb strike would be expected to be far larger than that experienced over most speed bumps.

In another example, the signal processor 704 compares the sensor data to known data patterns associated with known surface elements. In this example, if the signal processor 704 identifies a threshold similarity between a pattern in the sensor data and a known data pattern, then the signal processor 704 identifies the surface element as the surface element associated with the known data pattern. The threshold similarity is a measure of similarity between the sensor data pattern and the known data pattern that is greater than a predetermined threshold (e.g., greater than 90% similarity between the sensor data pattern and the known data pattern). The signal processor 704 provides the identity of the surface elements to the behavior selector 706.

In an embodiment, the behavior selector 706 determines a vehicle behavior based on the identified surface elements. A vehicle behavior includes a vehicle trajectory and/or a vehicle driving setting (e.g., vehicle speed; torque at the motor, wheel(s), etc.; acceleration, and/or suspension mode). In an implementation, the behavior selector 706 selects, from a database of known vehicle behaviors, a vehicle behavior associated with an identified surface element. The database of known vehicle behaviors can include a lookup table or decision tree. As an example, when the identified surface element is a parking block, the behavior selector 706 selects a vehicle behavior of halting parking actions, which is a vehicle behavior associated with the parking block. As another example, when the identified surface element indicates that the vehicle has left its lane (e.g., a lane marking, a rumble strip, or a pavement marker), adjusting steering to return to lane center is an action traceable to a known desired behavior to stay within lane.

In an embodiment, rather than determining the vehicle behavior directly from the identified surface elements, the behavior selector 706 first determines based on the identified surface elements that a vehicle is encountering a particular scenario. The behavior selector 706 then selects a vehicle behavior based on the particular scenario. In an example where the identified surface element is an off-road surface (e.g., rock or sand), the behavior selector 706 determines that at least one wheel is off-road. In response, the behavior selector 706 determines to limit the vehicle speed and/or steering wheel angle. And in an example where the identified road element is a curb, the behavior selector 706 determines that at least one front wheel of the vehicle is blocked. In response, the behavior selector 706 determines that a backward action is necessary and any current forward motion should be stopped.

In an embodiment, the behavior selector 706 adds a representation of the identified surface element to a shared database that can be accessed by a fleet of vehicles. The representation includes a location of the surface element, the sensor data associated with the surface element, the data pattern identified in the sensor data, and/or the selected vehicle behavior associated with the surface element. In some examples, the behavior selector 706 obtains from the shared database expected road elements along the vehicle path. The expected road elements are historical road elements that have been previously detected along the vehicle path or that there is information that indicates that the road elements are located along the vehicle path. The behavior selector 706 then determines, based on the expected road elements, vehicle behavior for the vehicle. Example behaviors include slowing down, adjusting steering, or adjusting pressuring in an active suspension system to prevent uncomfortable vertical acceleration otherwise induced by driving over a pothole.

As shown in FIG. 7, the behavior selector 706 provides the selected vehicle behavior to the motion planner 708 and/or the controller 710. In particular, if the selected vehicle behavior is a vehicle trajectory, then the behavior selector 706 provides the vehicle behavior to the motion planner 708. The motion planner 708 plans the vehicle motion based on the selected vehicle trajectory. The motion planner 708 then provides instructions to the controller 710. And if the selected vehicle behavior is a vehicle setting, then the behavior selector 706 provides the vehicle behavior to the controller 710. In some examples, the behavior selector 706 provides selected vehicle behaviors to both the motion planner 708 and the controller 710.

Figure 8:
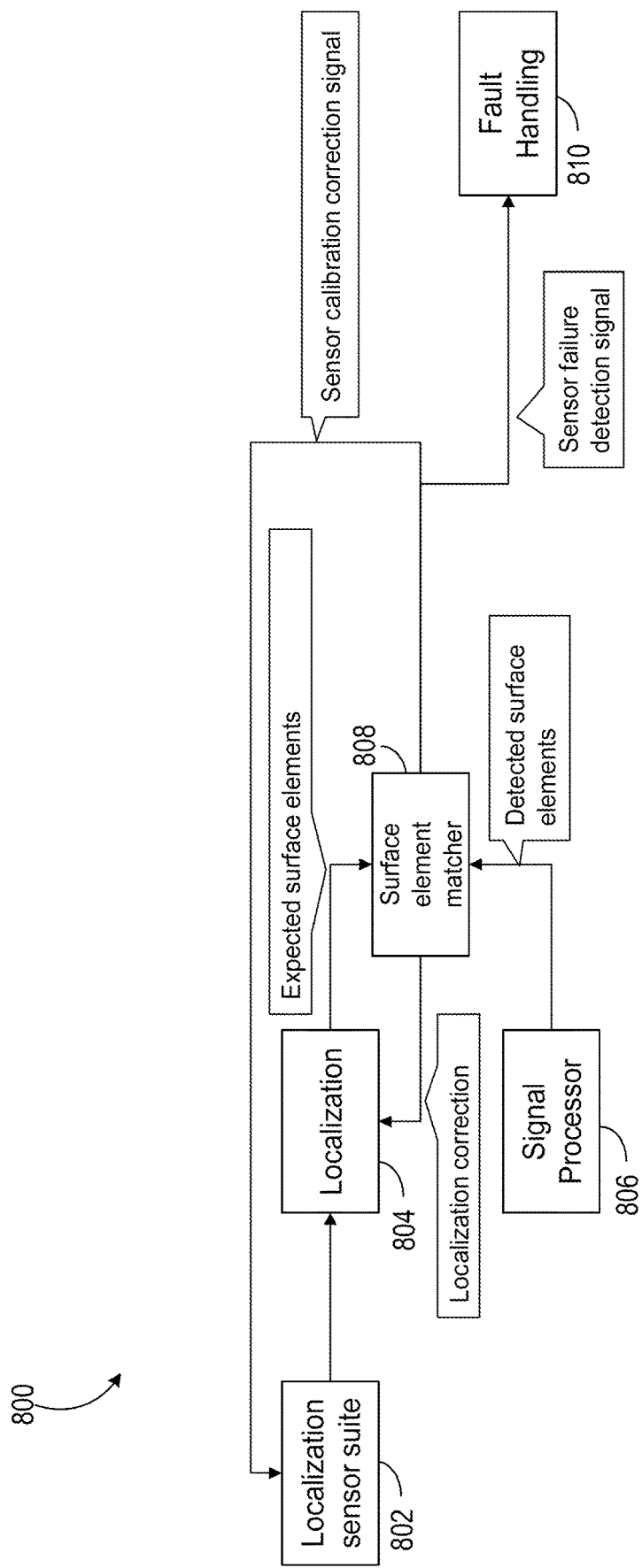
FIG. 8 illustrates a block diagram of an example system for localization correction and sensor impairment detection.

FIG. 8 illustrates a block diagram of an example system 800 for surface localization correction and sensor impairment detection. The system 800 is configured to determine, based on an identified surface element, whether a surface localization is inaccurate. Additionally, the system 800 is configured to determine, based on the identified surface element, whether a vehicle sensor is impaired. Further, the system 800 is configured to perform corrective actions in response to determining that the surface localization is inaccurate and/or that a vehicle sensor is impaired.

As shown in FIG. 8, the system 800 includes localization sensor suite 802, localization module 804, signal processor 806, surface element matcher 808, and fault handling module 810. Note that the system 800 is shown for illustration purposes only, as the system 800 can include additional components and/or have one or more components removed without departing from the scope of the disclosure. Further, the various components of the system 800 can be arranged and connected in any manner.

In an embodiment, the localization sensor suite 802 includes at least one localization sensor that generates location data. Example localization sensors include GPS, IMU, sensors that measure vehicle linear accelerations and angular rates, wheel speed sensors for measuring or estimating wheel slip ratios, wheel brake pressure or braking torque sensors, engine torque or wheel torque sensors, steering angle sensors, and other sensors such as LiDAR. The localization sensor suite 802 provides location data to the localization module 804.

In an embodiment, the localization module 804 determines the vehicle position by using data from the localization sensor suite 802 to calculate a position. For example, the localization module 804 uses data from a GNSS (Global Navigation Satellite System) sensor and geographic data to calculate a longitude and latitude of the vehicle. The geographic data is associated with (e.g., representing) one or more objects within a distance from the vehicle (e.g., buildings, trees, and/or the like). The geographic data, is for example, determined at least in part based on data from LiDAR systems of the vehicle. The data used by the localization module 804 includes high-precision maps of the roadway geometric properties, maps describing road network connectivity properties, and maps describing roadway physical properties. In an embodiment, the localization module 804 uses the location data to generate a map that describes spatial locations of surface elements that were identified by the vehicle or that were received from a shared database. The surface elements included in the map are referred to as expected surface elements.

In an embodiment, the signal processor 806 is the same as, or similar to, the signal processor 704 of FIG. 7. Like the signal processor 704, the signal processor 806 is configured to perform operations related to processing the sensor data. In particular, the signal processor 806 receives, from a surface sensor suite (not illustrated in FIG. 8), sensor data associated with surface elements. The signal processor 806 detects road elements based on the received sensor data.

In an embodiment, the surface element matcher 808 is configured to determine, based on detected surface elements, whether a vehicle sensor is impaired or whether a surface localization is inaccurate. In order to do so, the surface element matcher 808 receives information indicative of a detected surface element from the signal processor 806. The information includes a type of surface element and a spatial location of the surface element. The surface element matcher 808 also receives, from the localization module 804, expected surface elements in the area in which the surface element was detected. The surface element matcher 808 determines whether the type of the detected surface element is similar to, or the same as, a type of one of the expected surface elements in the area. If the surface element matcher 808 determines that there is not a match, then the surface element matcher 808 determines whether a vehicle sensor has previously received sensor data from the area. If the vehicle sensor has previously received sensor data from the area and it is estimated that the surface element was present at the time (e.g., the surface element is not temporary), then the surface element matcher 808 determines that the vehicle sensor is impaired. The surface element matcher 808 then provides a sensor failure detection signal to a fault handling module 810.

Conversely, if the surface element matcher 808 determines that the type of the detected surface element matches a type of an expected surface element, then the surface element matcher 808 compares the spatial location of the detected surface element to a spatial location of the expected surface element. If the spatial locations are similar to or the same as one another, then the surface element matcher 808 determines that the surface localization is accurate. However, if the spatial locations do not match, the surface element matcher 808 determines that the surface localization is inaccurate. In response, the surface element matcher 808 sends a localization correction signal to the localization module 804. The localization correction signal includes the detected spatial location of the surface element. Additionally or alternatively, the surface element matcher 808 sends a sensor calibration correction signal to the localization sensor suite 802. The localization sensor suite 802 uses the sensor calibration correction signal to calibrate a localization sensor that calculated the spatial location of the expected surface element.

In an embodiment, the surface element matcher 808 uses the comparison of the detected road element to the expected road elements to reduce false positives for crash detection. In an example, if the surface element matcher 808 determines that a detected road element matches an expected road element, then the surface element matcher 808 determines that the vehicle has not driven over an unknown object or crashed.

In an embodiment, the fault handling module 810 is configured to perform corrective actions in response to receiving a sensor failure detection signal from the surface element matcher 808. The fault handling module 810 is responsible for mapping of a fault to a corrective action, and triggering the corrective action. For example, if a crash is detected (or suspected), the vehicle can be commanded to stop at the side of the roadway (to avoid hit and run scenario or to wait for remote operator intervention). Conversely, if the fault is a sensor failure, or if the sensor is redundant or non-critical in the context a multi-modal sensor suite, a less urgent maintenance action is prescribed. For example, the vehicle is directed to no longer accept additional passenger requests and to return to a maintenance facility.

Figure 9:
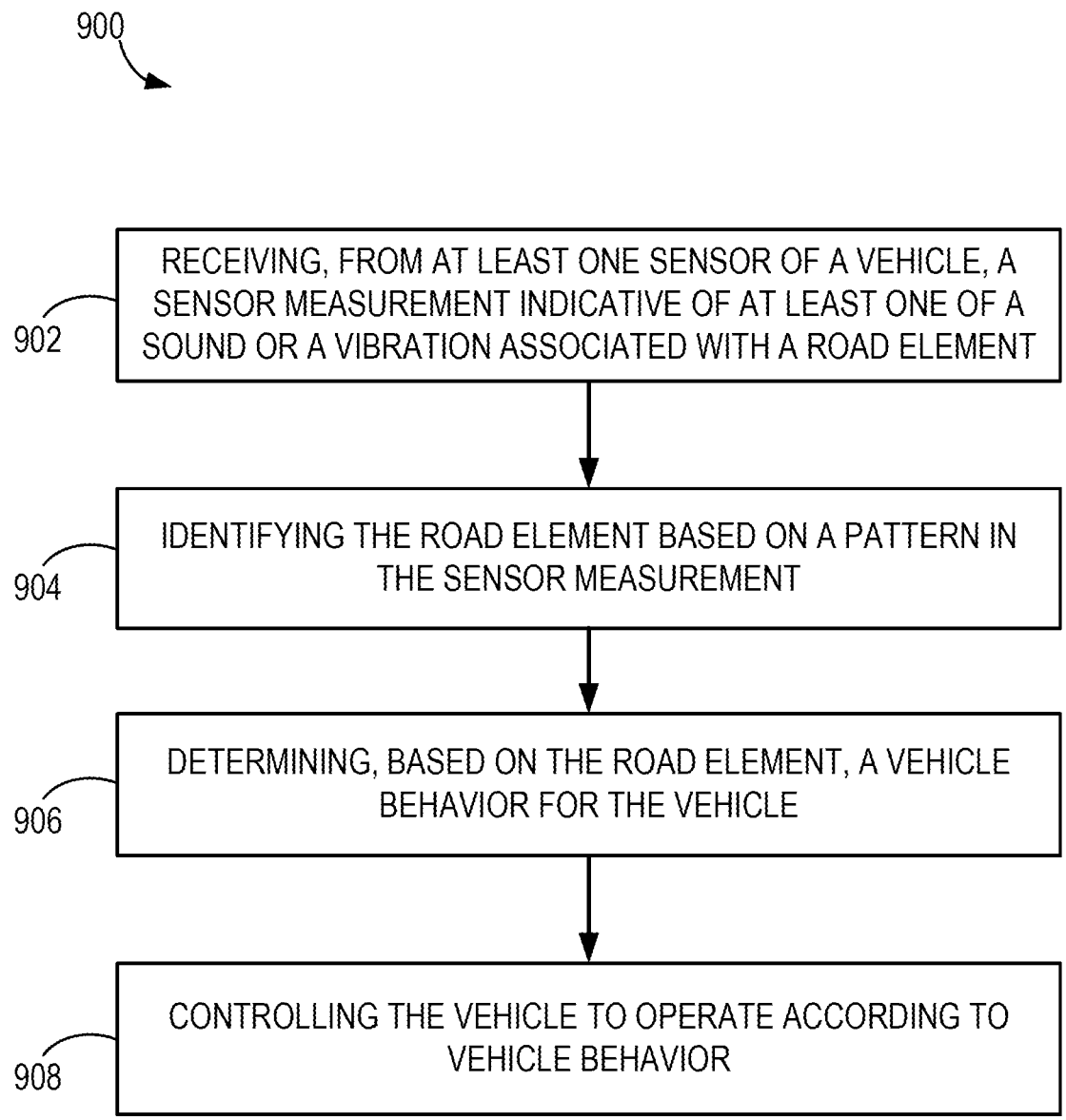
FIG. 9 shows a flowchart of a process for surface guided decision making.

FIG. 9 shows a flowchart of a process 900 for surface guided decision making. The process 900 can be carried out by the system 700 or the system 800. A sensor measurement indicative of at least one of a sound or a vibration associated with a road element is received 902 from at least one sensor of a vehicle. In an example, at least one sensor of the vehicle includes the sensors 702 of FIG. 7. The road element is identified 904 based on a pattern in the sensor measurement. In an example, the pattern in the sensor measurement is extracted by the signal processor 704 of FIG. 7 or the signal processor 806 of FIG. 8. Further, the signal processor 704 or the signal processor 806 identify the road element based on the extracted pattern.

A vehicle behavior for the vehicle is determined 906 based on the road element. In an example, the vehicle behavior is determined by the behavior selector 706 of FIG. 7. The vehicle behavior includes a vehicle trajectory and/or a vehicle driving setting, and is selected by the behavior selector 706 of FIG. 7 based on the road element. The vehicle is controlled 908 to operate according to the vehicle driving behavior. In an example, the vehicle is controlled by the controller 710 of FIG. 7.

In some implementations, the process 900 further includes adding a representation of the road element to a shared map. The representation includes at least one of: a spatial location of the road element, the sensor measurement, the pattern in the sensor measurement, or the vehicle behavior. In an example, the shared map can be updated and accessed by a fleet of vehicles.

In some implementations, the road element is associated with a location, and the process 900 further involves comparing the measured road element to expected road elements in the location; determining that the road element does not match any of the expected road elements; and in response, determining a failure of a sensor that has previously performed a measurement in the location. In an example, these operations are performed by the surface element matcher 808 of FIG. 8. In some examples, consistent discrepancies between the map and recent observations can conversely indicate a change in infrastructure rather than a sensor failure (e.g., a new pothole has developed due to wear on the road surface). In such examples, evidence of a map change can be determined if the discrepancy is observed from multiple vehicles.

In some implementations, the sensor is associated with the vehicle or another vehicle.

In some implementations, the road element is associated with a location, the sensor measurement is a first sensor measurement, and the process 900 involves comparing the road element to an expected road element in the location; determining a threshold discrepancy between the first sensor measurement and a second sensor measurement associated with the expected road element; and in response to determining the threshold discrepancy, determining that a sensor that performed the second sensor measurement is not calibrated. In an example, these operations are performed by the surface element matcher 808 of FIG. 8.

In some implementations, the process 900 further involves re-observing a location of the road element; comparing the recently observed road element to expected road elements in the location; determining that the recently observed road element matches a first expected road element; or conversely determining a discrepancy between the location of the recently observed road element and a stored location of the first expected road element; and updating the stored location of the first expected road element based on the location of the recently observed road element.

In some implementations, the vehicle behavior is a first vehicle behavior, and the process 900 further involves obtaining, from a shared database, expected road elements along a road path for the vehicle; and determining, based on the expected road elements, a second vehicle behavior.

In some implementations, at least one sensor includes at least one of: a vibration sensor, a tilt sensor, a shock sensor, an accelerometer, a gyroscope, a tire pressure sensor, a suspension pressure sensor, an extension sensor, or a sound pressure sensor microphone.

In some implementations, the process 900 further involves comparing the road element to an expected road element in the location; and in response to identifying a match for the road element, determines that the vehicle has not driven over an unknown object or crashed.

In some implementations, identifying the road element based on the pattern in the sensor measurement involves comparing the sensor measurement to historical patterns stored in a database, where the historical patterns are associated with respective road elements; identifying a first historical pattern with a threshold level of similarity to the pattern; and determining that the respective road element associated with the first historical pattern is the road element.

In the foregoing description, embodiments of the invention have been described with reference to numerous specific details that may vary from implementation to implementation. The description and drawings are, accordingly, to be regarded in an illustrative sense rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one computer-readable medium storing computer-executable instructions;
   at least one processor configured to execute the computer-executable instructions, the execution carrying out operations including:
   receiving, from at least one sensor of a vehicle, a sensor measurement indicative of at least one of a sound or a vibration associated with a road element;
   identifying the road element based on a pattern in the sensor measurement;
   determining a location of the road element;
   comparing the road element to expected road elements in the location;
   determining that the road element matches a first expected road element;
   determining a discrepancy between the location of the road element and a stored location of the first expected road element;

updating the stored location of the first expected road
element based on the location of the road element;
determining, based on the road element, a vehicle behavior for the vehicle; and
causing the vehicle to operate according to the vehicle behavior.

2. The system of claim 1, the operations further comprising:
adding a representation of the road element to a shared map, wherein the representation of the road element comprises at least one of: a spatial location of the road element, the sensor measurement, the pattern in the sensor measurement, or the vehicle behavior.

3. The system of claim 1, wherein the road element is associated with a location, and wherein the operations further comprise:
comparing the road element to an expected road element in the location;
determining that the road element does not match the expected road element; and
in response to determining that the road element does not match the expected road element, determining a failure of a sensor that has previously performed a measurement in the location.

4. The system of claim 3, wherein the sensor is associated with the vehicle or another vehicle.

5. The system of claim 1, wherein the road element is associated with a location, wherein the sensor measurement is a first sensor measurement, and wherein the operations further comprise:
comparing the road element to an expected road element in the location;
determining a threshold discrepancy between the first sensor measurement and a second sensor measurement associated with the expected road element; and
in response to determining the threshold discrepancy, determining that a sensor that performed the second sensor measurement is not calibrated.

6. The system of claim 5, wherein the sensor is associated with the vehicle or another vehicle.

7. The system of claim 1, the operations further comprising:
comparing the sensor measurement to historical patterns stored in a database, wherein the historical patterns are associated with respective road elements;
identifying a first historical pattern with a threshold level of similarity to the pattern; and
determining that a road element associated with the first historical pattern is the road element.

8. The system of claim 1, wherein the vehicle behavior is a first vehicle behavior, and wherein the operations further comprise:
obtaining from a shared database expected road elements along a road path for the vehicle; and
determining, based on the expected road elements, a second vehicle behavior.

9. The system of claim 1, wherein the at least one sensor comprises at least one of: a vibration sensor, a tilt sensor, a shock sensor, an accelerometer, a gyroscope, a tire pressure sensor, a suspension pressure sensor, an extension sensor, or a sound pressure sensor microphone.

10. The system of claim 1, the operations comprising:
comparing the road element to an expected road element in a location; and
in response to identifying a match for the road element, determining that the vehicle has not driven over an unknown object or crashed.

11. The system of claim 1, wherein the pattern is an expected frequency change of a signal of the sensor measurement, an expected magnitude change of the signal of the sensor measurement, or an expected directional change of the signal of the sensor measurement.

12. A method comprising:
receiving, from at least one sensor of a vehicle, a sensor measurement indicative of at least one of a sound or a vibration associated with a road element;
identifying the road element based on a pattern in the sensor measurement;
determining that the road element matches a first expected road element;
comparing the road element to expected road elements in the location;
determining that the road element matches a first expected road element;
determining a discrepancy between the location of the road element and a stored location of the first expected road element;
updating the stored location of the first expected road element based on the location of the road element;
determining, based on the road element, a vehicle behavior for the vehicle; and
causing the vehicle to operate according to the vehicle behavior.

13. A non-transitory computer-readable storage medium comprising at least one program for execution by at least one processor of a first device, the at least one program including instructions which, when executed by the at least one processor, cause the first device to perform the method of claim 12.

14. The method of claim 12, comprising:
adding a representation of the road element to a shared map, wherein the representation of the road element comprises at least one of: a spatial location of the road element, the sensor measurement, the pattern in the sensor measurement, or the vehicle behavior.

15. The method of claim 12, comprising:
comparing the road element to an expected road element in a location, wherein the road element is associated with the location;
determining that the road element does not match the expected road element; and
in response to determining that the road element does not match the expected road element, determining a failure of a sensor that has previously performed a measurement in the location.

16. The method of claim 15, wherein the sensor is associated with the vehicle or another vehicle.

17. The method of claim 12, comprising:
comparing the road element to an expected road element in a location, wherein the road element is associated with the location and wherein the sensor measurement is a first sensor measurement;
determining a threshold discrepancy between the first sensor measurement and a second sensor measurement associated with the expected road element; and
in response to determining the threshold discrepancy, determining that a sensor that performed the second sensor measurement is not calibrated.

18. The method of claim 17, wherein the sensor is associated with the vehicle or another vehicle.

19. The method of claim 12, comprising:
comparing the sensor measurement to historical patterns stored in a database, wherein the historical patterns are associated with respective road elements;

identifying a first historical pattern with a threshold level of similarity to the pattern; and determining that a road element associated with the first historical pattern is the road element.

\* \* \* \* \*

UNITED STATES PATENT AND TRADEMARK OFFICE
CERTIFICATE OF CORRECTION

| | | |
|---|---|---|
| PATENT NO. | : 11,878,695 B2 | |
| APPLICATION NO. | : 17/158497 | |
| DATED | : January 23, 2024 | |
| INVENTOR(S) | : Bence Cserna, Shih-Yuan Liu and Scott D. Pendleton | |

It is certified that error appears in the above-identified patent and that said Letters Patent is hereby corrected as shown below:

On the Title Page

Column 2 (Item (56) Other Publications), Line 1, delete ""SAE;" and insert -- "SAE: --.

In the Claims

Column 22, Line 12, In Claim 12, delete "that the road element matches a first expected" and insert -- a location of the --.

Signed and Sealed this
Ninth Day of April, 2024

Katherine Kelly Vidal
*Director of the United States Patent and Trademark Office*